United States Patent [19]
Beazley

[11] 3,727,775
[45] Apr. 17, 1973

[54] PICKUP AND TRANSFER DEVICE
[75] Inventor: Aubrey G. Beazley, El Paso, Tex.
[73] Assignee: Farah Manufacturing Company, Inc., El Paso, Tex.
[22] Filed: Feb. 23, 1971
[21] Appl. No.: 118,053

Related U.S. Application Data

[63] Continuation-in-part of Ser. No. 851,303, Aug. 19, 1969, Pat. No. 3,589,320.

[52] U.S. Cl.............214/1 BC, 112/121.29, 294/1 R
[51] Int. Cl..............................................B65g 25/04
[58] Field of Search................214/1 BC, 1 BS, 1 BH, 214/1 BT, 1 BV, 1 B, 6 FS, 6 DS, 8.5 D, 8.5 C; 294/1 R, DIG. 2; 112/121.12, 121.29

[56] References Cited

UNITED STATES PATENTS

| 2,600,068 | 6/1952 | Meyers | 294/1 R |
|---|---|---|---|
| 2,550,920 | 5/1951 | Gilbert | 214/1 BH |
| 3,312,327 | 4/1967 | Clapp et al. | 214/1 BS X |
| 3,342,519 | 9/1967 | Hunt et al. | 294/1 R X |
| 2,610,882 | 9/1952 | Sutliffe | 294/1 R |
| 3,063,578 | 11/1962 | Millar | 214/8.5 D |
| 3,391,926 | 7/1968 | Jaatinen | 214/8.5 D X |
| 3,583,614 | 6/1971 | Foster, Jr. | 214/6 DS |
| 3,474,747 | 10/1969 | Noiles | 112/121.12 |

FOREIGN PATENTS OR APPLICATIONS 1,016,134   1/1966   Great Britain ......................214/6 FS Primary Examiner—Robert J. Spar
Attorney—Curtis, Morris & Safford

[57] ABSTRACT

A fabric workpiece pickup and transfer device having an arm and an adhesive tape trailed over guide means on the arm to which a workpiece is pressed into adhesive contact, a motor for rotating the arm from one position to another, means for advancing the tape, and electrical circuit means for controlling the pickup and transfer functions; means for releasing the workpiece following transfer are also provided and may be operatively interconnected with said device.

14 Claims, 4 Drawing Figures

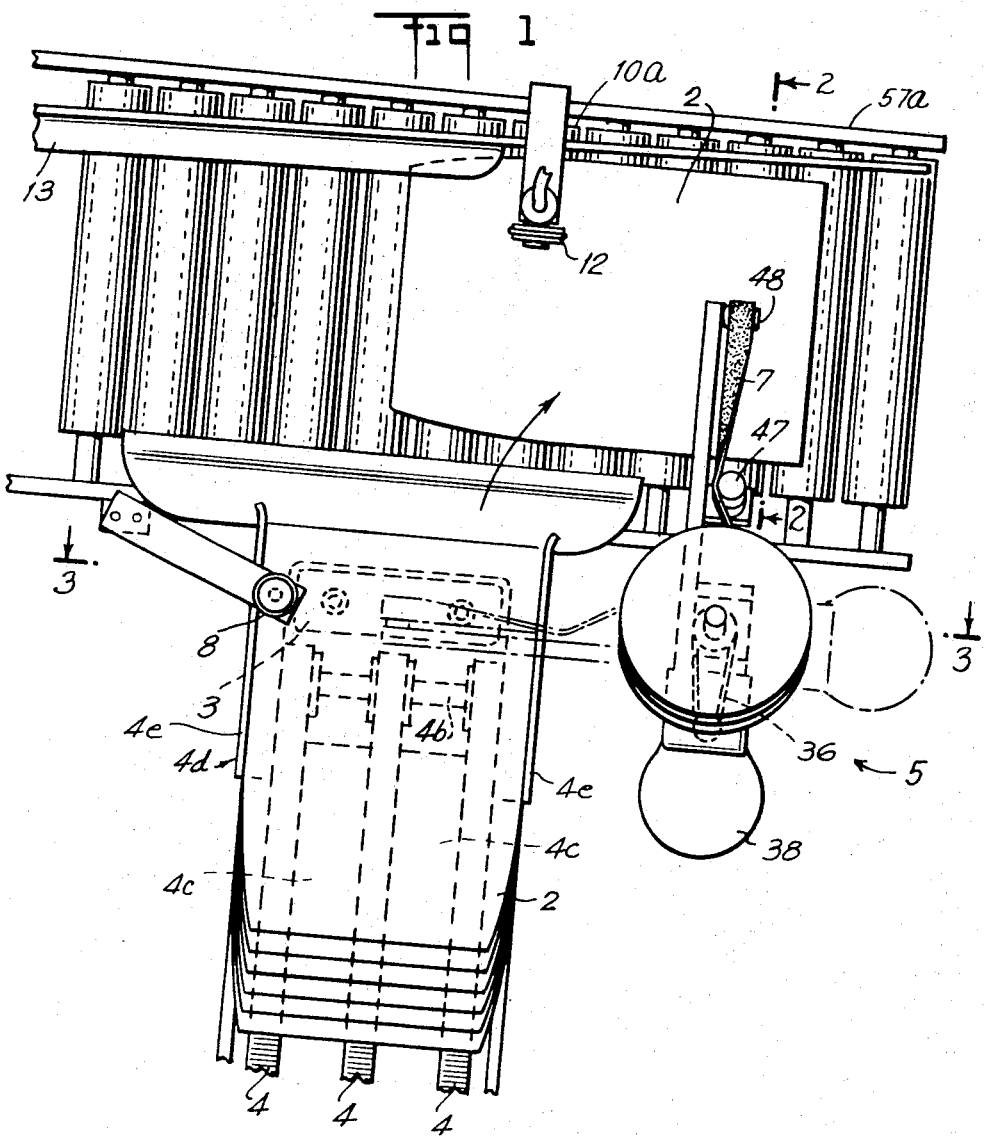
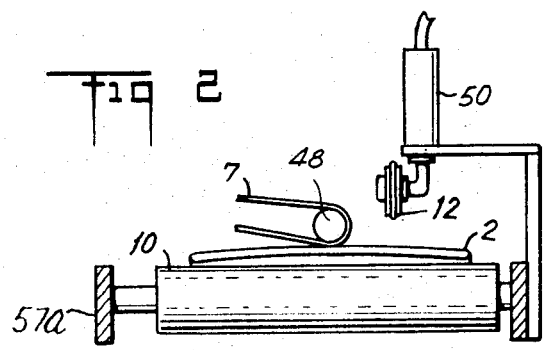

two switches 40 and 42 are affixed in vertical alignment to a stationary pedestal 46. These switches can be constructed to either make contact on raised portions of the cams or at depressions in the cams.

Motor 39 is mounted at the base of pedestal 46 and drives the pickup and transfer assembly through shaft 45. The pickup position of the device 5 is illustrated in FIG. 1 by the dash lines and the delivery position by solid lines. Motor 39 is reversible, and in cooperation with switches 40 and 42 turns arm 6 90° in either direction to the respective pickup and delivery positions. This motor has substantially no coasting characteristics, i.e., it can be stopped in a predetermined position with an error of less than ±1.5 angular degrees. A representative motor is SS50PIRC available from Superior Electric Company, New Britain, Conn.

The adhesive tape 7 is carefully guided from reel 33 onto the upper free riding guide pulley 47 disposed vertically to the line of travel of the tape, and then, by imparting a 90° twist, the tape is guided over a rimless but crowned guide pulley 48 which has its rotating shaft affixed to the pickup transfer arm 6 perpendicular to the axis of rotation of the conveyor pulleys and with the lower edge of the pulley 48 protruding below the arm 6. Tape 7 is then twisted 90° again and guided back to reel 35 around lower guide pulley 47. The positioning of the respective tape holding and guiding elements is on a line through the middle of the perpendicularly transverse axis of pulley 48, the middle of longitudinal axes of the pulleys 47, and the middle of the axis 34 on which the tape reels 33 and 35 are rotating, thus giving the best operating characteristics for keeping the tape operating smoothly and without over-ride. Generally, the tape 7 is advanced only during the counterclockwise swing of arm 6 by an appropriate increment.

Experience has shown that it is sufficient to advance the tape by about 1/32 inch during the counterclockwise swing. Motor 38 is geared to rotate the tape advancing wheel very slowly, and therefore, may be run without interruption during the operation of the machine, or may be stopped for a given period during each cycle. The upper housing 49 of the pickup and transfer unit including the motor 38 oscillates with motor 39 when motor 39 drives the central shaft 45.

FIG. 2 shows an end view of the pocket blank conveyor 57a with a conveyor roller 10a and an adhesive tape 7 holding a pocket blank 2. Blank 2 is removed from the tape 7 when the puller wheel 12 is lowered by the pneumatically driven cylinder 50. When not actuated, wheel 12 is spring loaded to reside in the up position. Once detached, the blank travels towards a sewing machine or other device on conveyor 57a.

In the cross-section of the pickup and transfer unit, represented in FIG. 3, it is seen that the lifting bar 3 generally has a few pockets on it at all times. The bottom edges of the pocket blanks 2 are resting on rubber pad 442 on lifting bar 3 in the depicted orientation. As different thicknesses of pocket blanks are encountered, such as when material of different thicknesses is used or when a facing cloth is present on the inside of the pocket blank, the stacked bundle becomes uneven. Hence, the depicted lifting action and orientation of the blanks is helpful for the successful operation of the machine. The pickup and transfer device 5 is considerably simpler and easier to operate than a single piece pickup device, such as illustrated in U.S. Pat. No. 3,386,396, issued June 4, 1968. Of course, the operation of the lifting bar 3 and the pickup and transfer device 5 is interrelated as further explained in detail in the following section on the electrical control circuit. Equivalent lifting means in place of the pneumatic cylinder 44 may be employed, such as cams, racks and pinions, or wheels connected through a pitman, to lift bar 3. Similarly, the tape drive mechanism may be provided with a rachet mechanism and keyed to the 90° oscillating motion of the drive shaft 45 as provided by gears coupled to motor 39. It is also possible to use a motor which will rotate device 5 in only one direction, wherein following release of blank 2 on conveyor 57a, arm 6 rotates in a continuous clockwise manner until it is again over lifting bar 3.

ELECTRICAL CONTROL CIRCUIT

The initial condition of the circuit shown in FIG. 4 is where arm 6 still has a blank 2 attached to tape 7 while positioned over conveyor 57a. The symbol H is used in the drawing to indicate an AC source having a voltage of 120 volts with respect to ground. This circuit is easily integratable into any other circuit which contains components for the control of related manufacturing operations.

In the circuit diagram of FIG. 4, the relay contacts are shown in the positions they take when the transfer arm 6 is in its furthest clockwise position and is holding a pocket blank over the conveyor rollers 10 as shown in FIGS. 1 and 2. When the circuit is in this condition, capacitor 522 is connected to a common positive 26 volt DC supply and is fully charged to that voltage. When a START switch 520 is pressed, capacitor 522 is suddenly connected to the coil 524 of a PULLER relay 523. This connection creates a current pulse through coil 524 and causes the relay contacts operated by that coil to switch positions. One such set of contacts 525 closes and thus actuates a solenoid-operated pneumatic valve 526. Valve 526 actuates the pneumatic cylinder 50 shown in FIG. 2. Operation of the solenoid valve 526 drives cylinder 50 downwardly against the conveyor roll 10a, as has been explained previously. This performs the "pulling" function of the machine in which the pocket blank is pulled loose from the transfer mechanism and is freed to be carried by the conveyor rolls 10 to the sewing machine or other device.

Operation of the puller relay 523 also closes contacts 528 which energize the coil 534 of another relay 535. Because of the transient nature of the current flowing through the puller relay coil 524 from capacitor 522, the capacitor quickly becomes de-energized. However, relay 535 remains energized because it has a set of holding contacts 536. The pickup and transfer device drive motor 39 is now started when contacts 540 of relay 535 are actuated.

Drive motor 39 is a two-winding reversible AC motor. When terminal 541 is grounded, the motor rotates in a counterclockwise direction, and when terminal 543 is grounded, the motor 39 rotates in a clockwise direction. When the transfer mechanism is in its furthest clockwise position, clockwise microswitch 42 is open and counterclockwise microswitch 40 is closed. When contacts 540 of relay 535 are actuated, terminal 541 of motor 39 is grounded and the motor rotates in a

PICKUP AND TRANSFER DEVICE

This application is a continuation-in-part of copending application Ser. No. 851,303 filed on Aug. 19, 1969 and now U.S. Pat. No. 3,589,320 issued on June 29, 1971.

This invention relates to an apparatus for picking up and transferring fabric workpieces, and more particularly, to an apparatus with a tape pickup which holds the workpiece by adhesion of a tape and rotates about an axis to transfer the workpiece from one position to another.

In the production of garments, such as pants, almost endlessly repetitive sewing operations are required for a competitive manufacture of these garments. Thus, for example, in the manufacture of pants, the back pockets of pants are fashioned from a pocket blank which undergoes a number of manufacturing steps until it is incorporated into the finished pants article. During the manufacturing process, there is a need to transfer the pocket blanks from one position to another. For example, as illustrated in the above-identified patent application there is the need to transfer each pocket blank individually from a pocket blank supply to means for feeding a sewing machine so that each blank may be processed by the sewing machine separately.

A primary problem in making the transfer of fabric workpieces is that the workpieces tend to stick together. Many means have been proposed to overcome this adhesion between workpieces such as injecting pressurized air, between plies, vibrating the plies or stack of plies, as well as the use of adhesive tape to separate the top ply from a stack. All of the prior devices, however, share a common disadvantage of overcomplexity for the function performed. The present invention, however, provides a simple and uncomplicated means for pickup, transfer and advancement of imprecisely aligned workpieces.

In accordance with the present invention, a pickup and transfer device is provided which is particularly adapted for moving fabric workpieces from a workpiece supply source such as a conveyor to a means for feeding a sewing machine such as an input conveyor for the sewing machine. An adhesive tape extends over guide means on an extended arm of the device and is suitably advanced from one reel on the device to another so that a fresh portion of tape is used for each pickup and transfer. A workpiece is brought into contact with the tape by means such as by a lifting bar which raises all the workpieces until the top workpiece contacts the tape. After contact is made, the device rotates its arm toward the input conveyor thus dragging the single workpiece from the top of the workpiece supply source. This dragging of the workpiece easily overcomes the adhesion of the workpieces by shearing the top piece from the supply stack. Such shearing pickup offers a more reliable pickup method than if the workpiece were lifted vertically by the arm. After the workpiece is picked up, it is transferred to the input conveyor by rotation of the device about a vertical axis. At an appropriate time, a puller wheel may be actuated and the workpiece sheared from its contact with the tape to be transported by the input conveyor to a sewing machine.

In the drawings:

FIG. 1 is a top view of an embodiment of the present invention.

FIG. 2 is an end view taken along line 2—2 in FIG. 1.

MECHANICAL APPARATUS

Figure 3:
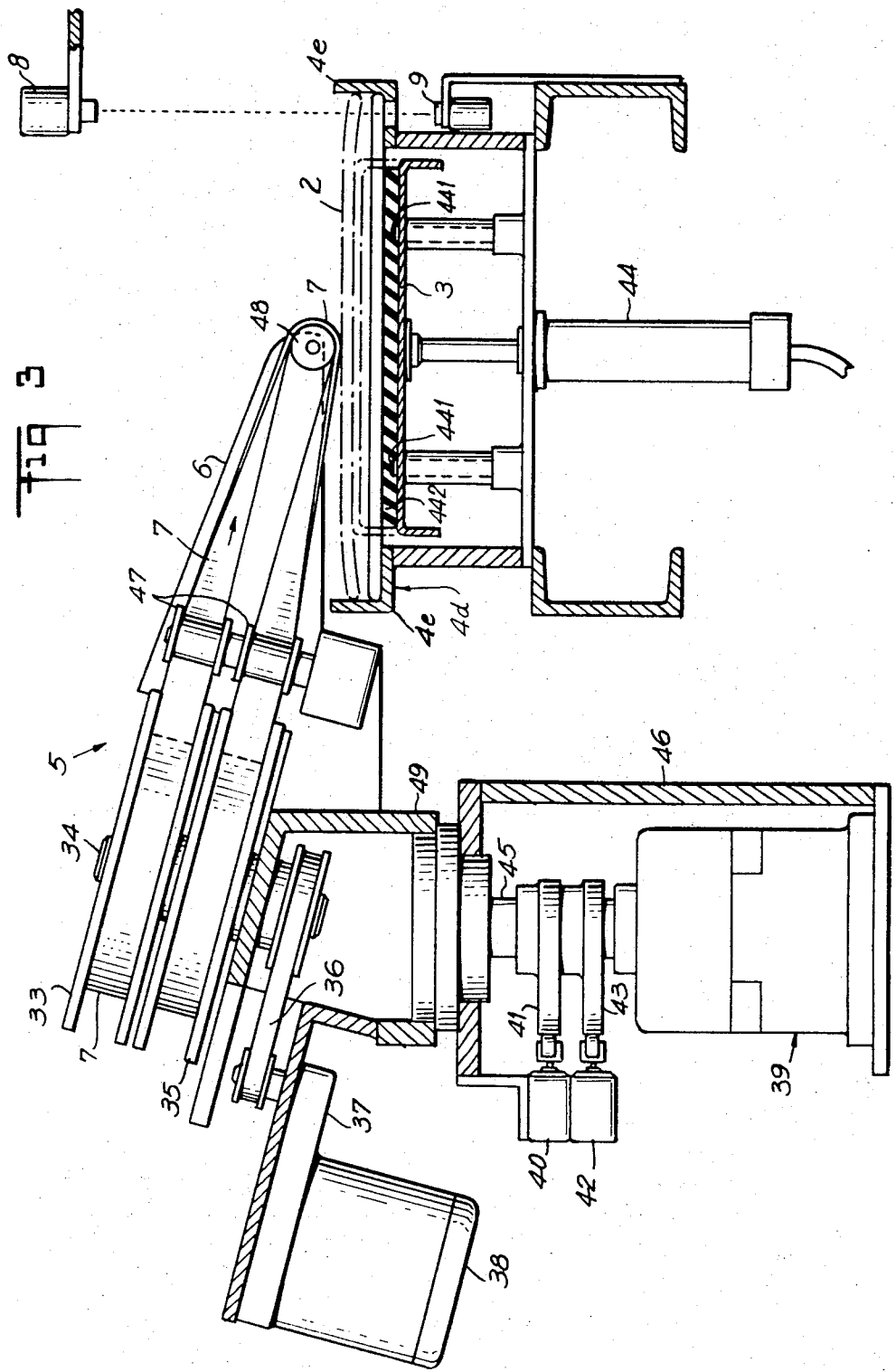
FIG. 3 is a side view in section taken along line 3—3 in FIG. 1.
Figure 4:
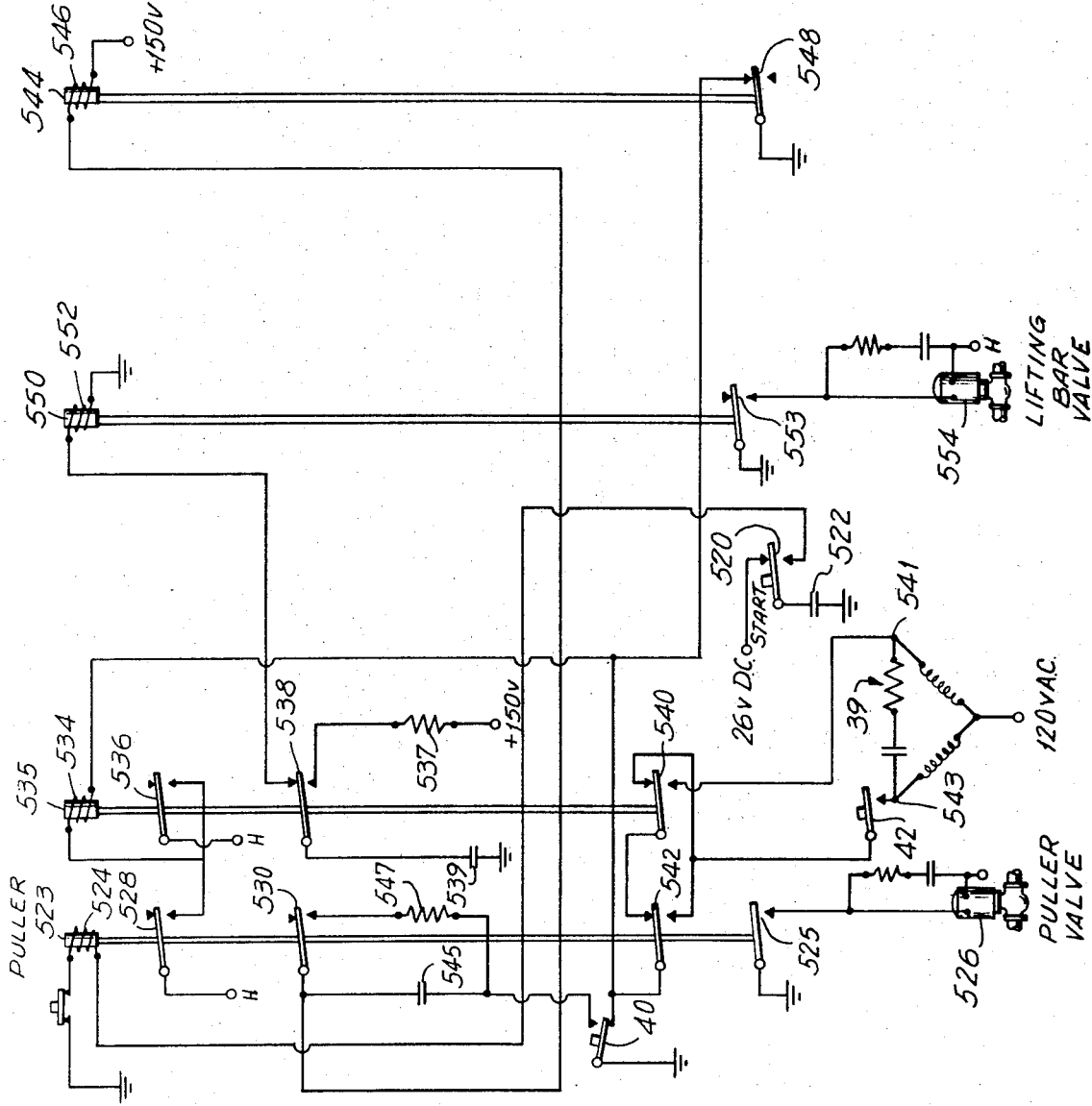
FIG. 4 is a schematic circuit diagram illustrating the operation of the device shown in FIGS. 1, 2 and 3.

Referring first to FIGS. 1 and 3, an adhesive tape pickup and transfer device 5 is shown which is used for picking up a pocket blank 2 from conveyor belts 4 with the aid of lifting bar 3 and placing it on another conveyor 57a.

Pickup and transfer device 5 consists of an upper tape reel 33 which is free to rotate about an axis 34 of the transfer device 5 and a lower reel 35 which is driven about axis 34 by a motor 38 acting through gear train 37 and belt linkage 36. Rotation of reel 35 causes the adhesive tape 7 to be slowly unwound in small increments, or continuously, from the upper reel 33 as it is wound on lower tape reel 35.

As the bundle of blanks is advanced by the conveyor belts 4, each blank, either individually or one resting on top of another, is urged onto lifting bar 3. The lifting bar 3 is actuated when the arm 6 of tape pickup and transfer device 5 is swung 90° to a position directly above lifting bar 3. When lifting bar 3 rises, blank 3 is pressed to an adhering contact with tape 7.

After the adhesive pickup of the blank by the pickup device, arm 6 is swung 90° clockwise with the blank securely dangling from the tape. This 90° transfer places the blank directly over the rotating, sprocket chain interlinked conveyor rollers 10 forming the conveyor 57a. The adhesive tape 7 is sufficiently "sticky" to hold the blank in slight contact with the conveyor 57a while the rollers 10 rotate at full speed.

When the sewing machine or other processing device is about ready to receive the next blank, a puller wheel 12 is actuated to press the fabric blank 2 against a conveyor roller 10a which detaches the blank from the adhesive tape 7 and feeds it along conveyor 57a.

The pickup and transfer arm 6 of the transfer device 5 is rotated through 90° in both clockwise and counterclockwise directions by means of a motor 39 mounted in the base of device 5. This motor is appropriately actuated by a signal from the puller wheel 12 when wheel 12 is actuated during removal of the previous blank held by the pickup and transfer arm 6. Upon actuating the motor 39, the pickup and transfer arm 6 is swung counterclockwise to a predetermined position over the lifting bar 3 where motor 39 is automatically stopped. The appropriate stop position is controlled by a counterclockwise limiting switch 40 which rides on a raised counterclockwise limiting cam 41 rigidly attached to shaft 45. The switch 40 is deactivated by depression in the cam at the end of the swing. When the counterclockwise rotation stops, the lifting bar 3 is actuated. This bar 3, covered with an elastomer such as sponge rubber pad 442, lifts the several layers of the fanned out pocket blanks upwardly by means of at least one lifting bar cylinder 44. Two guide rods 441 are attached to bar 3 to keep it in alignment. When cylinder 44 retracts, motor 39 is again activated and returns arm 6 to a position over the conveyor 57a. This clockwise motion of arm 6 is then stopped by a clockwise limit switch 42 activated by a clockwise cam 43 which is rigidly attached to shaft 45 the same as cam 41. The counterclockwise direction until it has traveled approximately 90°, at which point a cam 41 attached to the shaft 45 opens microswitch 40 so that the motor 39 stops.

Actuation of the counterclockwise microswitch 40 connects one end of the capacitor 545 to ground. The other end of capacitor 545 is connected to a positive 150 volt source through coil 546 of another relay 544. This connection actuates relay 544 and opens its contacts 548. Opening of contact 548 removes the energization of coil 534 of relay 535, and causes all of the contacts of relay 535 to return to their initial condition. The pickup and transfer mechanism is now in its furthest counterclockwise position and is ready to pickup a new pocket.

When relay 535 was actuated, a capacitor 539 was connected through a resistor 537 to 150 volt source and thus became charged. When relay 535 is de-energized, the charged capacitor 539 becomes connected to a coil 552 of relay 550. Capacitor 539 discharges its stored energy through the coil 552 and operates contacts 553 to energize the solenoid of a solenoid-actuated lifting bar valve 554. When the transient current from the capacitor 539 decreases, after a short time, to a value below the holding current value of relay 550, contacts 553 reopen. The lifting bar valve 554 actuates vertically driven pneumatic cylinder 44 to lift several layers of the pocket blanks up against the adhesive tape 7 thus causing the uppermost pocket to adhere to the tape. When the valve 554 becomes de-energized, the remaining pocket blanks drop back to their original position as cylinder 44 moves back to its original position. The entire lifting cycle takes place within about 0.1 second.

It should be evident that the timing sequence of the foregoing operation is controlled by the capacitance values selected for the capacitors 539 and 545. Increasing or decreasing their capacitance would respectively lengthen or shorten their transient delay times. With relay 544 deenergized, contact 548 connects terminal 543 of the drive motor 39 to ground through contact 542 of the puller relay 523, contact 540 of relay 535, and the clockwise microswitch 42 which is now closed. This causes the motor 39 to rotate in a clockwise direction and moves the pocket which is stuck to the tape 7 through a 90° angle to a position overlying the conveyor rollers 10. At this point, the clockwise microswitch 42 opens, motor 39 becomes de-energized, and the pocket pickup and transfer mechanism is ready for another cycle of operation.

It should be noted that capacitor 545 remains charged after motor 39 stops. However, when the puller relay 523 is actuated at the start of the next cycle of operation, contact 530 connects capacitor 545 in series with a resistor 547 to dissipate the charge on capacitor 545 and prepare it for operation in the manner described above.

What is claimed is:

1. An automatically operable apparatus for picking up fabric workpieces from a first position and transferring said workpieces to a second position, said apparatus comprising, a frame, an arm rotatably mounted in said frame for movement between said first and second positions, adhesive means mounted on said arm, means for bringing a workpiece into adhesive contact with said adhesive means at said first position, means for rotating said arm between said first and second positions, means for disengaging said workpiece from said adhesive means at said second position, said disengaging means comprising a conveyor located at said second position and means for engaging said workpiece with said conveyor; and means for cyclically operating said rotating means, said disengaging means and said means for bringing a workpiece into contact with said adhesive means.

2. An apparatus as described in claim 1 wherein said adhesive means is an adhesive tape.

3. An apparatus as described in claim 2 including a pair of reels mounted on said arm for respectively supplying and receiving said tape, and guide means for directing said tape about said arm means between said reels and for positioning said tape to contact a workpiece between said reels.

4. An apparatus as described in claim 3 including, means for advancing said tape from said supply reel to said receiving reel.

5. An apparatus as described in claim 4 wherein said means for bringing the workpiece into adhesive contact with said adhesive means comprises a lifting bar mounted at said first position for reciprocal movement towards and away from said arm.

6. An apparatus as described in claim 5 wherein said means for rotating said projection comprises an electric motor.

7. An automatically operable apparatus for picking up and transferring fabric workpieces comprising an arm extending from said apparatus, an adhesive tape, means for guiding said adhesive tape around said arm, a first reel for supplying said tape and a second reel for taking up said tape, a first motor for driving said second reel for advancing and taking up said tape, a means for raising the workpiece to place said workpiece into adhesive contact with said tape, a second motor for rotating said arm from one position to another, means for cyclically controlling said motors and said raising means, and a wheel actuated for engaging said workpiece against a moving conveyor to disengage the workpiece from adhesive contact with said tape, and means for cyclically controlling the actuation of said wheel.

8. An automatically operable apparatus for picking up a fabric workpiece at a first position and transferring said workpiece to a second position, said apparatus comprising a frame, an arm rotatably mounted on said frame for movement between said first and second positions, an adhesive tape supply reel and an adhesive tape takeup reel respectively rotatably mounted on said arm, an adhesive tape operatively connected to and extending between said reels, guide means mounted on said arm for guiding said tape between said reels and positioning said tape to contact a workpiece at said first position, at a location on said tape between said reels, a first motor for rotating said takeup reel to advance said tape along said arm from said supply reel to said takeup reel, means for raising a workpiece at said first position into adhesive contact with said tape at said location thereon between said reels, a second motor for rotating said arm between said first and second positions, means for disengaging said workpiece from said tape at said second position and means for cyclically operating said motors and said raising means.

9. Apparatus as defined in claim 8 wherein said disengaging means includes a conveyor located at said second position and cyclically operable means for engaging a workpiece at said second position against said conveyor whereby said workpiece is pulled by said conveyor from said tape.

10. Apparatus as defined in claim 9 wherein said engaging means comprises a freely rotatable wheel mounted for cyclical movement between a position adjacent said conveyor wherein the wheel engages a workpiece against the conveyor and a second position wherein the wheel is spaced from said conveyor.

11. Apparatus as defined in claim 10 wherein said supply and takeup reels are mounted for rotation along a common axis.

12. Apparatus as defined in claim 11 wherein said means for bringing the workpiece into adhesive contact with said adhesive means comprises a lifting bar mounted at said first position for reciprocal movement towards and away from said arm.

13. Apparatus as defined in claim 10 including means for reversing the direction of said second motor.

14. Apparatus as defined in claim 13 wherein said second motor comprises a two winding reversible AC motor and said reversing means comprises a set of relays and switches which act to alternately ground the two motor windings.

* * * * *